United States Patent [19]
Ladin

[11] 3,870,384
[45] Mar. 11, 1975

[54] PRELOADING AND SEALING SYSTEM FOR CLUTCH BEARINGS

[75] Inventor: Eli M. Ladin, Ann Arbor, Mich.

[73] Assignee: Federal-Mogul Corporation, Southfield, Mich.

[22] Filed: Jan. 2, 1974

[21] Appl. No.: 432,232

Related U.S. Application Data

[63] Continuation of Ser. No. 289,580, Sept. 15, 1972, abandoned.

[52] U.S. Cl. ............ 308/187.2, 192/110 B, 277/95, 308/36.4
[51] Int. Cl. ............................................. F16c 33/78
[58] Field of Search ............ 308/187.1, 187.2, 36.4, 308/36.1, 36.2; 277/25, 94, 95, 65; 192/98, 110 B

[56] References Cited
UNITED STATES PATENTS

| | | | |
|---|---|---|---|
| 2,030,813 | 2/1936 | Dolza | 192/110 B |
| 2,725,965 | 12/1955 | Binder | 192/98 |
| 2,856,246 | 10/1958 | Gaubetz | 308/187.2 |
| 2,945,730 | 7/1960 | Murray | 308/187.2 |
| 3,357,529 | 12/1967 | Binder et al. | 192/98 |
| 3,401,779 | 9/1968 | Puidokas | 192/110 B |

*Primary Examiner*—Charles J. Myhre
*Assistant Examiner*—R. H. Lazarus
*Attorney, Agent, or Firm*—Harness, Dickey & Pierce

[57] ABSTRACT

A new clutch bearing assembly comprising a plurality of spherical anti-friction bearing elements adapted for engagement with raceways and cooperative inner and outer bearing race members, wherein a special sealing system is designed to axially preload the bearings and to afford a speed sensitive sealing system which contains lubricant material within the bearing assembly while excluding dirt.

17 Claims, 5 Drawing Figures

PATENTED MAR 11 1975　　　3,870,384
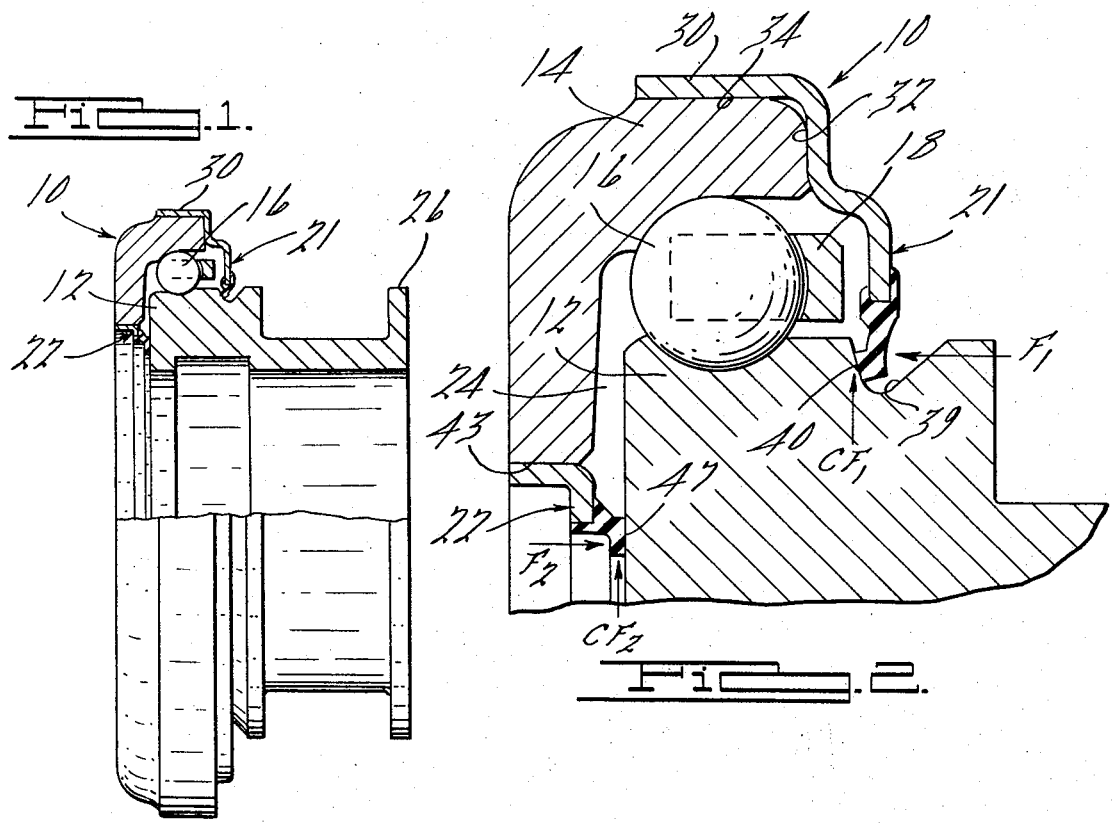
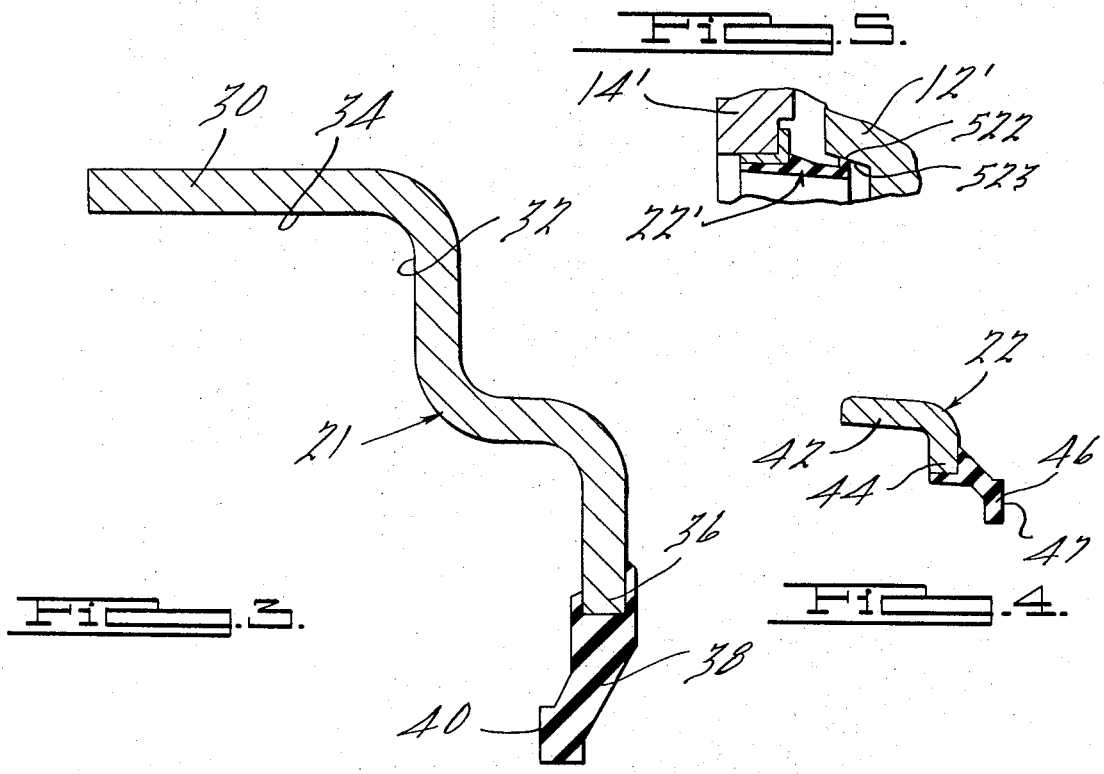

PRELOADING AND SEALING SYSTEM FOR CLUTCH BEARINGS

This is a continuation, of application Ser. No. 289,580, filed Sept. 15, 1972, now abandoned.

BACKGROUND OF THE INVENTION

This invention broadly relates to a new bearing assembly. More specifically this invention relates to a new bearing assembly which includes a special sealing system which acts in a special manner to preload and seal the bearing assembly.

Accordingly a main object of the invention is to provide a new improved clutch bearing assembly.

Another object of the present invention is to provide a new bearing assembly which is capable of preloading the balls and races to thereby prevent vibrations or chattering of the bearing assembly and also to lessen the skidding of the balls on the races.

Another object of the present invention is to provide a new bearing assembly which is less susceptible to damage from chattering or vibration and wherein the bearing assembly possesses improved endurance life.

Another object of the present invention is to provide a new clutch bearing assembly which utilizes a special sealing action.

Other objects, features, and advantages of the present invention will become apparent from the subsequent description and the appended claims taken in conjunction with the accompanying drawings, wherein like numerals in different drawings figures illustrate like elements.

SUMMARY OF THE INVENTION

A main feature of the invention herein is the facility of a special sealing system which is used to exert an axial load on the bearing assembly. This load causes the balls and races to be engaged under pressure while external load on the bearing assembly is removed. It has been discovered that this engagement prevents vibration or chattering from taking place between the races and the balls thereby eliminating the possibility of surface damage when the bearing assembly is idle. Also the special sealing action provided as a result of this invention results from increased pressure of the revolving rubber sealing lips caused by centrifugal force exerted on the sealing lips during rotation of the bearing assembly; and, thus the sealing action provided is speed sensitive and the sealing action acts to contain lubricant material within the bearing assembly while excluding dirt and the like from the interior workings of the assembly.

BRIEF DESCRIPTION OF THE DRAWINGS

FIG. 1 illustrates a view of the bearing of this invention in partially cut-away form;

FIG. 2 illustrates an exploded view of a portion of FIG. 1 illustrating the bearing assembly construction in greater detail;

FIG. 3 illustrates a cross-sectional view of a special seal used in the bearing construction of FIGS. 1 and 2;

FIG. 4 illustrates a cross-sectional view of another special seal utilized in the bearing construction of FIGS. 1 and 2; and, FIG. 5 illustrates an alternative embodiment in accordance with the invention herein.

DESCRIPTION OF PREFERRED EMBODIMENTS

Referring now in detail to the drawings, and in particular to FIGS. 1–4, a clutch release bearing assembly 10, in accordance with a preferred embodiment of the present invention, is shown generally as comprising an inner race member 12, an outer race member 14, plurality of spherical anti-friction bearing elements 16, a retainer or cage member 18, a first seal means designated 21, and a second seal means designated mens The inside of the bearing assembly designated 24 is preferably lubricated with a suitable bearing grease, and the bearing assembly 10 is mounted, for example, by utilization of the mounting support flange 26 which extends from the stationary inner race member 12.

FIG. 3 illustrates in more detail the first seal member 21 which includes a ring shaped annular flange portion 30 which is affixed to an outer portion of the race member 14 at the contact areas designated 32 and 34. The seal member 21 also includes a radially inwardly directed flange 36 to which there is suitably attached a flexible lip or seal 38 which makes sealing contact with annular groove 39 at the sealing surface 40 of the seal 38.

FIG. 4 illustrates in more detail the second seal member designated 22 which includes a circular shaped flange portion 42 which is suitably affixed to an inner circular surface 43 of the race member 14. Seal member 22 also includes a radially inwardly directed portion 44 to which there is suitably affixed a relatively flexible sealing lip or seal 46 which makes contact with the race member 14 at the sealing surface 47 of the seal 46

FIG. 5 illustrates another alternative embodiment of the sealing race performed by the seal member 22 and designated as seal member 22' in FIG. 5. As shown in FIG. 5, the sealing member 22' functions in a manner similar to the sealing member 22 of FIG. 1 relative to the stationary inner race member 12' and the outer race member 14' in FIG. 5. However, the seal member 22' in FIG. 5 exerts its sealing action at the surface designated 522 and the sealing action carried out at the sealing surface 522 is effected within the annular recess 523 formed in a stationary inner race member 12'.

The operation of the bearing assembly discovered and disclosed in accordance with this invention is as follows.

The strength of material or the stiffness of the material such as the rubber selected for the seal 38 pushes against the groove 39 in the inner race member 12 at the point designated 40 to cause the inner race 12 to move to the left as viewed in FIG. 2, or as shown by the direction of the arrow designated $F_1$. A more flexible or relatively resilient thin flexible material is used to fabricate the seal 46 such that the force exerted thereby at the point 47, as designated by the arrow $F_2$, is a force of lesser degree than the force $F_1$. Accordingly, this enables the inner race member 12 to be moved to the left due to the greater force $F_1$. As a result of the inner race 12 being moved to the left, since the force $F_1$ is greater than $F_2$, this causes the bearings 16 and races 12 and 14 to stay preloaded and engaged even though the external thrust load on the bearing assembly is removed. Accordingly, this engagement or preloading uniquely prevents race vibration or chattering due to looseness or separation in the bearing assembly.

The sealing action in accordance with the inventive embodiment disclosed in FIGS. 1–4 results from the speed of rotation of the outer race member 14 relative to the stationary inner race member 12, and as shown in FIGS. 1–4, the first seal member 21 and the second seal member 22 rotate with the outer race member 14 such that the centrifugal force exerted against seal 38 is in an outward direction illustrated by the arrow designated $CF_1$ which thereby causes an increased sealing action to occur as the speed of rotation of the bearing is built up because the centrifugal force in the direction of the arrow $CF_1$ causes the seal 38 to in effect rotate in a clockwise direction about the support 36 to thereby cause a greater sealing action at the sealing surface 40. With respect to the seal member 22, the rotation of this seal member 22 with the outer race member 14 causes the seal 46 to rotate about the support 44 such that the centrifugal force shown by the arrow $CF_2$ exerts a force on the seal 46 which causes it to rotate in a counter clockwise direction about the support 44, thus causing the seal to exert a greater sealing action at the sealing surface 47.

The advantages of this invention should be fairly apparent from the disclosure set forth above, however, certain specific advantages of the invention are as follows. First, the novel sealing system described above functions to axially preload the bearing assembly 10 and this causes the bearing balls and races to stay preloaded and engaged even when external thrust load on the bearing is removed. This preloading or engagement results in less skidding of the ball bearings on the races and the result of this is less damage to the races and balls and the improvement to the endurance life of the bearing assembly and grease contained therein. This engagement also prevents race vibration or chattering from taking place and accordingly the invention functions to prevent the possibility of surface damage when the bearing assembly is idle. Second, the bearing assembly described above provides a speed sensitive sealing system which contains lubricant material within the bearing assembly while excluding dirt and other undesirable particulate material therefrom. Third, the sealing system is so designed that the first sealing force of seal 21 exceeds the second sealing force exerted by seal 22 to thereby uniquely cause the bearing assembly to stay preloaded or engaged under pressure while external load on the bearing assembly is removed. Fourth, the special sealing action herein is enabled by the fact that first seal member and the second seal member both have an increased sealing action which is provided by the speed of rotation of the bearing assembly due to the fact that the seal members utilized herein take advantage of centrifugal force resulting from the rotation of the bearing assembly to increase the sealing action at the point where the rubber seal surfaces contact the stationary sealing surface. Fifth, it has been found to be a very significant advantage of the bearing assembly disclosed herein, such as a clutch release bearing assembly, that when the bearing assembly is actually used in an automotive application there is a significant amount of time when actual external load on the bearing assembly is removed because the automotive clutch is not in operation. Accordingly, during this time when the external load is removed there has been a problem in the past that clutch release bearings which were not preloaded in accordance with this invention had a tendency to vibrate and chatter to a significant extent. This vibration and chattering has led to surface damage at the points where the bearings contact the race members due to the constant repetitive hammering action exerted thereagainst. Accordingly this invention overcomes this problem because the bearing assembly of this invention is preloaded and the possibility of surface damage is thereby eliminated when the bearing is idle. Sixth, noise reduction is a very significant advantage realized from this invention.

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. A clutch release bearing assembly comprising,
    a first annular race member having means defining a first raceway thereon,
    said first raceway being generally semi-circular in cross-section,
    a second annular race member having means defining a second raceway thereon,
    said second raceway being generally semi-circular in cross-section,
    a plurality of generally spherical anti-friction bearing elements interposed between said first and second raceways,
    a first seal means of generally circular shape extending from said first race member and making a first sealing force contact with a surface portion on said second race member,
    a second seal means of generally circular shape extending from said first race member and making a second sealing force contact with another surface portion on said second race member,
        said first sealing force being greater in magnitude than said second sealing force contact thus causing relative axial movement between the first and second raceways to preload the assembly.

2. The invention of claim 1 wherein,
    said first sealing force includes an axially directed force vector which is opposed to and greater than the axially directed force vector of said second sealing force.

3. The invention of claim 1 wherein,
    said first seal means makes its sealing contact with the second race member within an annular channel formed in the second race member.

4. The invention of claim 1 wherein,
    the speed of rotation of the bearing assembly causes additional sealing action by said first and second seal means due to said seal means being speed sensitive from centrifugal force created in said seal means during rotation.

5. A bearing assembly comprising,
    a first annular race member having means defining a first raceway thereon,
    said first raceway being generally semi-circular in cross-section,
    a second annular race member having means defining a second raceway thereon,
    said second raceway being generally semi-circular in cross-section,
    a plurality of generally anti-friction bearing elements interposed between said first and second raceways,
    a first seal means of generally circular shape extending from said first race member and making a first sealing force contact with a surface portion on said second race member, a second seal means of generally circular shape extending from one said race member and making a second sealing force contact with another surface portion on the other race member, said first sealing force being greater in magnitude than said second sealing force contact thus causing relative axial movement between the first and second raceways to preload the assembly.

6. The invention of claim 5 wherein, said first sealing force including an axially directed force vector which is opposed to and greater than the axially directed force vector of said second sealing force.

7. The invention of claim 5 wherein, said first seal means makes its sealing contact with the second race member within an annular channel formed in the second race member.

8. The invention of claim 5 wherein, the speed of rotation of the bearing assembly causes additional sealing action by said first and second seal means due to said seal means being speed sensitive from centrifugal force created in said seal means during rotation.

9. The invention of claim 1 wherein, said second seal means makes its sealing contact with the second race member within an annular channel formed in the second race member.

10. The invention of claim 5 wherein, said second seal means makes its sealing contact with the second race member within an annular channel formed in the second race member.

11. A clutch release bearing assembly comprising, a first annular race member having means defining a first raceway thereon, said first raceway being generally semi-circular in cross-section, a second annular race member having means defining a second raceway thereon, said second raceway being generally semi-circular in cross-section, a plurality of generally spherical anti-friction bearing elements interposed between said first and second raceways, a first seal means of generally circular shape extending from said first race member and making a first sealing force contact with a surface portion on said second race member, a second seal means of generally circular shape extending from one of said race members and making a second sealing force contact with another surface portion on other of said race members said first sealing force being of significantly different magnitude than said second sealing force, thus causing relative axial movement between the first and second raceways to preload the assembly.

12. The invention of claim 11 wherein, the speed of rotation of the bearing assembly causes additional sealing action by said first and second seal means due to said seal means being speed sensitive from centrifugal force created in said seal means during rotation.

13. The invention of claim 11 wherein, said second seal means makes its sealing contact with the second race member within an annular channel formed in the second race member.

14. In an anti-friction bearing assembly adapted to accommodate radial and axial thrust loading and being of the type comprising an inner race means having an inner raceway, an outer race means having an outer raceway, and a plurality of anti-friction bearing elements constrained between said inner and outer race means and riding in the raceways thereof, the improvement for axially preloading said bearing elements with respect to said inner and outer race means which comprise: a resilient sealing means on one of said race means and disposed axially on one side of said plurality of bearing elements, said resilient sealing means extending from said one race means to the other of said race means, said bearing assembly being arranged and constructed such that said resilient sealing means is deflected from its free shape to exert an axial force between said inner and outer race means which causes an oppositely directed axial preloading force to be applied to said plurality of bearing elements.

15. The improvement as claimed in claim 14, wherein said resilient sealing means is disposed on said outer race means.

16. The improvement as claimed in claim 15, wherein said outer race means includes a retainer member, said resilient sealing means being affixed to said retainer member.

17. In an anti-friction bearing assembly being of the type comprising inner and outer race means having respective inner and outer raceways and a pluality of anti-friction bearing elements constrained between said inner and outer race means and riding in the raceways thereof, the improvement comprising a resilient annular sealing means extending between said inner and outer race means and disposed axially on one side of said plurality of bearing elements, said bearing assembly being arranged and constructed such that said resilient sealing means interacts with said inner and outer race means to cause said plurality of bearing elements to be preloaded in the raceways of the respective race means with predetermined axial thrust load.

* * * * *